United States Patent
Williams

[15] 3,665,361
[45] May 23, 1972

[54] FUSE WITH RETRACTABLE INDICATOR STRIP

[72] Inventor: Robert A. Williams, 55 Bounty Road East, Fort Worth, Tex. 76116

[22] Filed: Aug. 28, 1970

[21] Appl. No.: 67,892

[52] U.S. Cl. .............................................337/265, 337/260
[51] Int. Cl. .....................................................H01h 85/30
[58] Field of Search.................337/265, 267, 106, 206, 242, 337/266, 260; 116/114.5; 73/358

[56] References Cited

UNITED STATES PATENTS

| 3,340,430 | 9/1967 | Jenkins | 337/206 |
| 2,204,948 | 6/1940 | Pond | 337/265 |
| 2,036,008 | 3/1936 | White | 337/266 |

Primary Examiner—Bernard A. Gilheany
Assistant Examiner—F. E. Bell
Attorney—Wofford, Felsman and Fails

[57] ABSTRACT

A fuse for monitoring low level electrical energy by means of a strip of resilient material disposed beneath a translucent surface, with one end supported by a portion of a terminal pin inside an enclosure, and the other end supported by a wire to another terminal pin. The strip is formed to have residual stresses, such that when electrical energy at a predetermined level disintegrates the wire, the strip retracts. The width of the strip is such that the retracted position is easily detected as contrasted with the extended position. To improve visibility during the night, and often during the day, a light source is used in one embodiment of the invention such that retraction of the strip is detected more easily.

10 Claims, 10 Drawing Figures

Patented May 23, 1972

INVENTOR
Robert A. Williams
BY
Wofford & Felsman
ATTORNEYS

Patented May 23, 1972

INVENTOR
Robert A. Williams
BY
Wofford & Felsman
ATTORNEYS

FUSE WITH RETRACTABLE INDICATOR STRIP

BACKGROUND OF THE INVENTION

1. Field of the Invention

This invention relates in general to fuse apparatus or electrical energy monitors for the detection of excessive levels of electrical energy, and in particular to apparatus that is operational at extremely low energy levels, yet easily detected.

2. Description of the Prior Art

There are a wide variety of fuse devices in the prior art addressed to the problem of how best to detect the disintegration of a fusible element that may be extremely small. U.S. Pat. No. 1,520,201 illustrates one such device in which the melting of the fusible element causes a plate mounted on a flexible shaft to pivot from an invisible to a visible position. U.S. Pat. No. 1,567,529 illustrates a fuse device in which the melting of the fusible element enables a spring mounted plate to move from an invisible to a visible position.

SUMMARY OF THE INVENTION

The invention is a means for monitoring low level electrical energy through the provision of an easily detected visual means for determining, in lightness or darkness, whether a predetermined level of electrical energy was exceeded in the associated electrical circuit. This monitoring device was developed for weapons systems where accurate detection of possibly extremely low levels of electrical energy is essential.

In U.S. Pat. No. 3,505,635 I disclose a pyrotechnic detonator circuit test probe that is successfully utilized to prevent premature ejection of arming devices such as bombs or missiles from aircraft. Commonly, such unwanted ejections are caused by the presence of stray electrical energy that is present in the detonator circuit when arming an aircraft. In a co-pending application entitled "Electrical Contact Test Apparatus" Ser. No. 18,971, filed Mar. 12, 1970, I disclosed test apparatus especially suitable for testing the breach or breach cap used with ejection racks in military aircraft. In this test apparatus there is need for an indicator for spurious electrical energy. The present invention is ideally adapted to serve as such an indicator.

Broadly, the invention includes an enclosure means with a translucent top, with two terminal pins insulated from each other and extending through a portion of the enclosure. A resilient and retractable strip, which in its relaxed position assumes a curved, retracted configuration, has one end secured to one terminal pin, while the other end is held in an extended position by means of an electrically conducted wire secured to another terminal pin. Only a small, predetermined quantity of electrical energy is required to melt the small fusible wire, and yet, the visual appearance of the monitor is radically changed, since the strip is wide, and easily visible. For the purpose of improving detection during adverse lighting conditions, such as during the night, a light source may be included in or behind the apparatus at a location such that it is made visible when the strip assumes its retracted position. There are a wide variety of light sources that may be used to accomplish this result, including a coating of radium on a lower portion of the enclosure beneath the electrically conductive strip. Other details and advantages of the invention will become apparent in the following detailed description.

DESCRIPTION OF THE PREFERRED EMBODIMENTS

Figure 1:
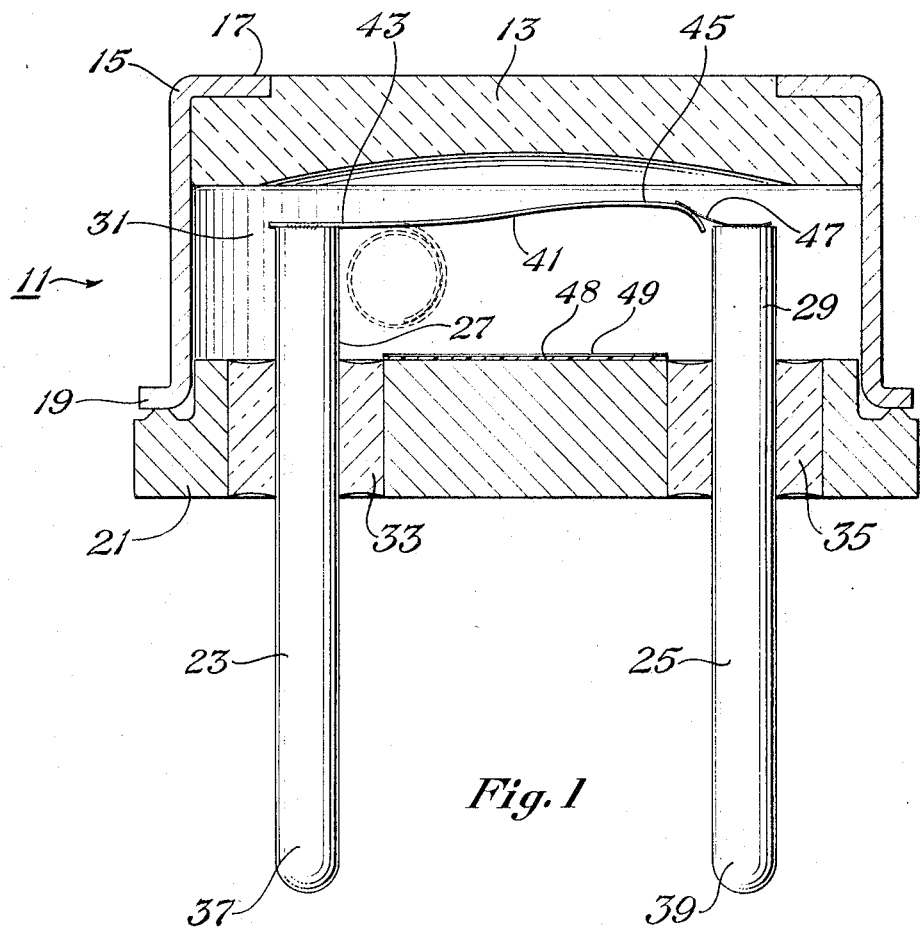
FIG. 1 is a side elevation view, partially in longitudinal section, showing an electrical energy monitor constructed in accordance with the principles of the invention.

The numeral 11 in the drawing designates an enclosure means having in this instance, a translucent top 13 supported by side walls 15 having a cylindrical wall section and an inwardly, radially extending shoulder 17. A lower outwardly, radially extending shoulder 19 is secured to a base portion 21 through which extends two terminal pins 23, 25 that have inner end portions 27, 29 protruding into an interior cavity 31 inside the enclosure means.

The terminal pins 23, 25 are insulated from each other, from the enclosure, and from the base portion 21 thereof by rings of electrically non-conductive material 33, 35, leaving a pair of outer end portions 37, 39 that protrude from the exterior of the enclosure means for insertion into socket means (not shown) of an electrical circuit to be monitored.

An electrically conductive and resilient strip 41 has one end region 43 welded or attached to the inner end portion 27 of the terminal 23, with the other end portion 45 being secured to the inner end portion 29 of the terminal 25 by a thin, electrically conductive and fusible wire 47 that is secured to the strip 41 and terminal 29 by welding or other suitable means. As shown in FIG. 1, the resilient strip 41 is thus held in an extended configuration, and is residually stressed such that when the wire 47 is melted by excessive electrical energy, the strip assumes a retracted configuration, as shown in phantom in FIG. 1. Such retraction is easily detected from a view above the translucent top 13.

For the purpose of improving the visibility of the monitor at night, a small metal plate 48 having a radium coating 49 on its exterior is secured between the terminal pins on an inner surface of the base portion 21 of the enclosure means 11, with the resilient strip in its extended position being between the light source and the translucent top such that in the retracted position, the resilient strip exposes the radium light source.

By way of example only, and not limitation, the translucent top 13 may be fabricated of glass, and the side walls 15 and base portion 21 may be constructed of Kovar metal. The glass, translucent top 13 and side wall 15 may be connected by being brazed in the Kovar metal, and the side wall connected with the base portion 21 by welding. The terminal pins 23, 25 are preferably constructed of Kovar that is gold plated, with insulation rings 33, 35 being constructed of glass.

The resilient strip 41 may be constructed of nickel having a relaxed configuration as shown in phantom in FIG. 1 and a thickness in a range of from 0.0002 to 0.002 inches and a width of 0.125 inches. The wire 47 is preferably constructed of tungsten or aluminum having a thickness in a range from 0.0001 to 0.005 inches, preferably 0.0002 inch. Currents as low as 0.01 millijoules may be detected with the smallest of the above dimensions.

In operation, the terminal pins 25, 27 and their outer end portions 37, 39 are inserted into receiving sockets (not shown) of an electrical circuit whose energy is to be monitored. When the circuit is energized, electrons flow between terminal pins 23, 25 through the resilient strip 41 and the connecting, electrically conductive wire 47. Should the electrical energy exceed the capacity of the fusible wire element 47, this element will have its metallurgical characteristics sufficiently altered by heat to fracture, thus enabling the residual stresses in the strip 41 to cause it to assume the retracted configuration shown in phantom in FIG. 1. During the daytime, the retraction of this strip can be easily detected, and at night, the detection simplified through use of the light source 49, which in this instance is a radium light source, but which could be an incandescent light, flourescent light, or "Betalight," which is a glass capsule, internally coated with a phosphor and filled with tritium gas, the radioactive isotope of hydrogen, which on decay emits exclusively Beta particles, i.e., electrons, with a maximum energy of 18.6 Kev. The Beta particles resulting from the radioactive decay are absorbed by the phosphor, causing it to emit light continuously in the visible spectrum. The glass is impervious to tritium and completely absorbs any Beta radiation not already absorbed in the phosphor. Such lights are explained in detail, with specifications, in the *Standard Betalight Handbook*, available from Canrad Precision Industries, Inc. of 630 Fifth Avenue, New York, New York.

Figure 2:
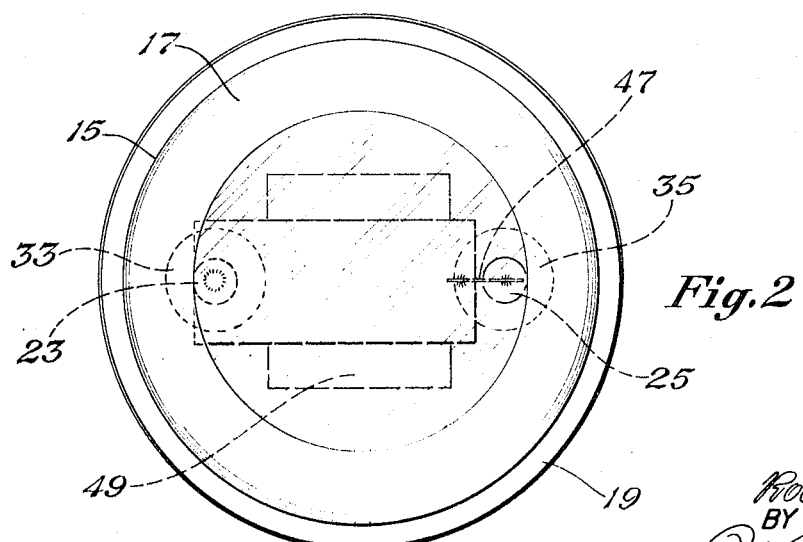
FIG. 2 is a plan view of the apparatus of FIG. 1.
Figure 3:
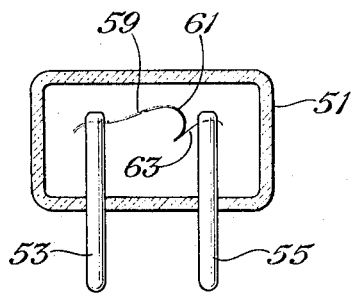
FIG. 3 is a side elevation view, partially in longitudinal section, showing a modified form of electrical energy monitor.
Figure 4:
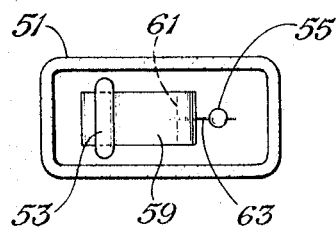
FIG. 4 is a plan view of the apparatus shown in FIG. 3.
Figure 10:
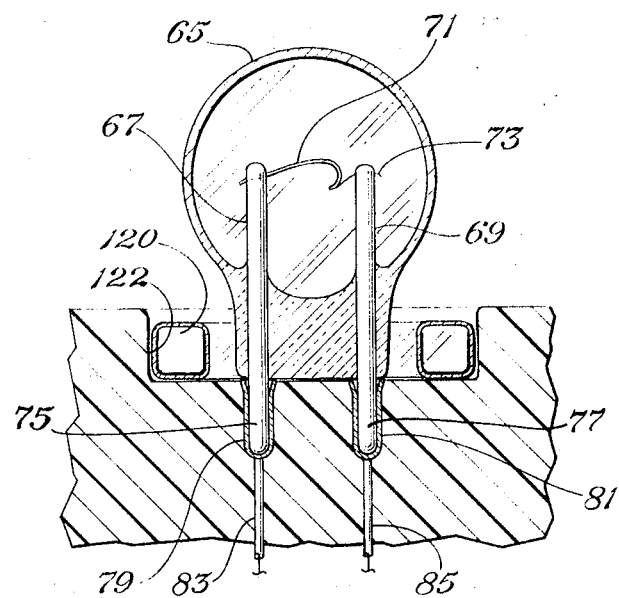
FIG. 10 is a side elevation view, partially in longitudinal section, showing an alternate form of electrical energy monitor, identical to the FIG. 5 embodiment, except for the use of an alternate light source.
Figures 8, 9:
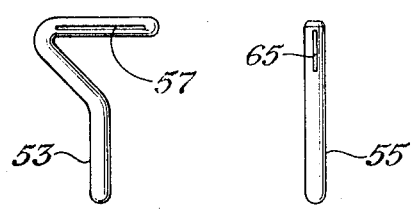
FIG. 8 is a side elevation view of one of the terminal pins of the apparatus shown in FIGS. 3 through 7.
FIG. 9 is a front elevation view of the other of the terminal pins of FIGS. 3 through 7.

In FIGS. 3 and 4 is illustrated an alternate embodiment of the invention in which an hermetically sealed glass enclosure 51 is fused around terminal pins 53, 55, as shown in FIG. 3. Terminal pin 53 supports through a slot 57 an electrically conductive resilient strip 59 having its outermost end portion 61 curved downward and supported by a wire 63 inserted into a receiving aperture 65 in the terminal pin 55 as shown in FIG. 10. As in the embodiment shown in FIG. 1 and 2, strip 59 and wire 63 are secured to their respective terminal pins by suitable solder material.

Figure 5:
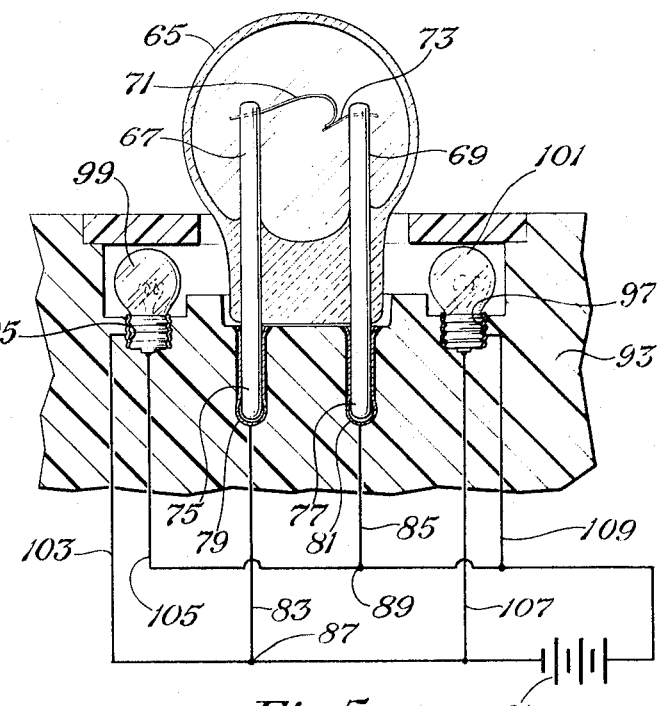
FIG. 5 is a side elevation view, partially in longitudinal section, showing an alternate form of electrical energy monitor, and one form of light source used in combination therewith.

FIG. 5 shows another embodiment of the invention in which a glass enclosure 65 is formed around two terminal pins 67, 69 that support a resilient strip of material 71 and a fusible wire 73 in the same manner as the embodiment shown in FIGS. 3 and 4. The lower end portions 75, 77 are inserted in receiving sockets 79, 81 connected with electrical conductors 83, 85 leading to terminals 87, 89 connected with an electric power source 91 disposed on either side of the base 93 that supported the glass enclosure 65. Sockets designated respectively 95, 97 are also supported by base 93 and receive in this instance incandescent bulbs 99, 101. Socket 95 is connected between electrical conductors 103, 105 that in turn are connected across the power source 91 in a manner similar to the connection of electrical conductors, 107, 109 leading to the socket 97. Hence, the incandescent bulbs 99, 101, provide a light source to better illuminate the monitoring device to improve visibility of resilient strip 71 to better indicate its retracted position.

Figure 6:
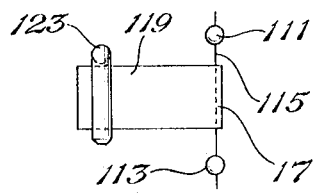
FIG. 6 is a plan view of yet another form of electrical energy monitor constructed in accordance with the principles of the invention.
Figure 7:
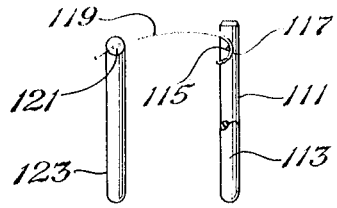
FIG. 7 is a side elevation view, partially in section, of the apparatus shown in FIG. 6.

Another embodiment is illustrated in FIGS. 6 and 7 in which the terminal post 111, 113 supports a fusible form of electrically conductive wire 115, over which a curved end portion 117 of a strip or resilient material 119, which may be, but is not necessarily electrically conductive, is placed, such strip extending through a slot 121 in a support post 123. In operation and when the monitored electric energy exceeds a predetermined level, the wire 115 fractures, enabling the resilient strip 119 to assume a retracted position that is easily visible.

In FIG. 10 is shown an embodiment similar to that of FIG. 5, having the glass enclosure 65 around terminal pins 67, 69 that support a resilient strip of material 71 and a fusible wire 73. Moreover, the lower end portions 75, 77 are inserted within the receiving sockets 79, 81 connected with electrical conductors 83, 85 of a circuit to be monitored. A light source 120, which is a tritium gas filled glass capsule of the type previously described is secured by a suitable adhesive within the annular groove 122. Such a combination is advantageous in that no external source of energy is required for the light source and as compared to the FIG. 1 embodiment, no radioactive materials are carried by the glass enclosure 65 of the fuse per se.

It should be apparent from the foregoing description that apparatus having significant advantages has been provided. The use of a strip of resilient material stretched between two terminal pins in its extended configuration and maintained in that configuration by a thin, electrically conductive wire secured to the strip and at least one terminal pin, enables the sensing of circuit overloads when working with very small quantities of electrical energy. The electrically conductive wire may be quite small in diameter such that it will fuse or disintegrate at the low energy levels that frequently must be detected in circuits such as those associated with the previously described detonator circuits used in weapons systems, especially those in modern, military aircraft. Although only a predetermined, low level electrical energy may be used to destroy the wire, the width of the resilient strip, which assumes a retracted position in the embodiment shown, through the use of residual stresses, enables convenient and rapid detection of the presence of excessive electrical energy. In addition, the use of a light source in combination with the above described retractable strip enables detection at night, and easier detection during the daytime, an especially advantageous feature of the invention when considering its use in military aircraft weapon systems, which must be armed under adverse lighting conditions, frequently at night.

While the invention has been shown in only a few of its forms, it should be apparent to those skilled in the art that it is not so limited but is susceptible to various changes and modifications without departing from the spirit thereof.

I claim:

1. An electrical energy monitor especially adapted to detect electric energy levels below a predetermined, low level, said monitor comprising:
    enclosure means having at least a translucent top;
    two terminal pins insulated from each other and extending through a portion of the enclosure means to define a pair of outer end portions that protrude exteriorly from the enclosure means and a pair of inner end portions protruding into an interior cavity;
    an electrically conductive, resilient strip, having an easily visible width greater than its thickness and which in its relaxed position assumes a curved, retracted configuration, one end region of the strip being secured to the inner end portion of one of the terminal pins;
    an electrically conductive wire secured to the other end region of the electrically conductive strip and carried by the inner end portion of the other of said terminal pins to stretch said strip to an extended configuration to generate residual, flexural stresses therein.

2. The monitor defined by claim 1 in which the said resilient strip has a thickness in a range from 0.0002 to 0.002 inches.

3. The monitor defined by claim 2 in which said wire has a thickness in a range from 0.0001 to 0.005 inches.

4. The monitor defined by claim 1 which further includes a light source carried by the enclosure means generally between the terminal pins, with said resilient strip in its extended configuration being between the light source and the translucent top of the enclosure means.

5. An electrical energy monitor especially adapted to detect electric energy levels below a predetermined, low level, said monitor comprising:
    enclosure means having at least a translucent top;
    two terminal pins insulated from each other and extending through a portion of the enclosure means to define a pair of outer end portions that protrude exteriorly from the enclosure means and a pair of inner end portions protruding into an interior cavity;
    a retractable strip having an easily visible width greater than its thickness and which in its relaxed position assumes a curved, retracted configuration, one end region of the strip being secured to the inner end portion of one of the terminal pins;
    an electrically conductive wire secured to said strip and communicating electrically between said terminal pins, maintaining said strip in an extended position.

6. The monitor defined by claim 5 which further includes a light source carried adjacent the enclosure means with said resilient strip in its extended configuration being exposed to the light source.

7. An electrical energy monitor especially adapted to detect electric energy levels below a predetermined, low level, said monitor comprising:

enclosure means having at least a translucent top;

two terminal pins insulated from each other and extending through a portion of the enclosure means to define a pair of outer end portions that protrude exteriorly from the enclosure means and a pair of inner end portions protruding into an interior cavity;

a resilient strip located in said enclosure means and having an easily visible width greater than its thickness and which in its relaxed position assumes a curved, retracted configuration;

an electrically conductive wire located in said enclosure means and in electrical communication with said terminal pins;

said resilient strip being held by said wire to an extended residually stressed configuration.

8. The monitor defined by claim 7 in which the said resilient strip has a thickness in a range from 0.0002 to 0.002 inches.

9. The monitor defined by claim 8 in which said wire has a thickness in a range from 0.0001 to 0.005 inches.

10. The monitor defined by claim 7 which further comprises:

support means located in said enclosure for supporting one end of said resilient strip;

said wire extending between and being supported by both of said terminal pins;

the other end of said resilient strip being supported by said wire extending between said terminal pins.

* * * * *